(12) United States Patent
Suresh et al.

(10) Patent No.: US 11,768,966 B2
(45) Date of Patent: *Sep. 26, 2023

(54) SECURE PUF-BASED DEVICE AUTHENTICATION USING ADVERSARIAL CHALLENGE SELECTION

(71) Applicant: Intel Corporation, Santa Clara, CA (US)

(72) Inventors: Vikram Suresh, Portland, OR (US); Raghavan Kumar, Hillsboro, OR (US); Sanu Mathew, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,326

(22) Filed: Sep. 7, 2022

(65) Prior Publication Data

US 2023/0004681 A1  Jan. 5, 2023

Related U.S. Application Data

(63) Continuation of application No. 17/132,387, filed on Dec. 23, 2020, now Pat. No. 11,455,431.

(51) Int. Cl.
| | |
|---|---|
| G06F 21/44 | (2013.01) |
| G06F 21/73 | (2013.01) |
| G06F 21/75 | (2013.01) |
| G06F 21/31 | (2013.01) |
| G06F 21/79 | (2013.01) |

(52) U.S. Cl.
CPC .............. G06F 21/75 (2013.01); G06F 21/31 (2013.01); G06F 21/79 (2013.01); *G06F 2221/2103* (2013.01)

(58) Field of Classification Search
CPC .......... G06F 21/75; G06F 21/31; G06F 21/79; G06F 21/73; G06F 21/44; G06F 2221/2103
See application file for complete search history.

(56) References Cited

U.S. PATENT DOCUMENTS

| | | | |
|---|---|---|---|
| 9,584,329 B1 * | 2/2017 | Trimberger | ........... H04L 9/3278 |
| 9,966,954 B1 | 5/2018 | Yang et al. | |
| 2011/0317829 A1* | 12/2011 | Ficke | .................... H04L 9/3278 380/46 |

(Continued)

OTHER PUBLICATIONS

Secure and Reliable XOR Arbiter PUF Design: An Experimental Study based on 1 Trillion Challenge Response Pair Measurements, by Kim et al.; published 2017. (Year: 2017).*

(Continued)

*Primary Examiner* — Vu V Tran
(74) *Attorney, Agent, or Firm* — JAFFERY WATSON MENDONSA & HAMILTON LLP

(57) ABSTRACT

A method comprises generating, during an enrollment process conducted in a controlled environment, a dark bit mask comprising a plurality of state information values derived from a plurality of entropy sources at a plurality of operating conditions for an electronic device, and using at least a portion of the plurality of state information values to generate a set of challenge-response pairs for use in an authentication process for the electronic device.

18 Claims, 10 Drawing Sheets

(56) References Cited

U.S. PATENT DOCUMENTS

| | | | |
|---|---|---|---|
| 2015/0092939 A1* | 4/2015 | Gotze | G09C 1/00 |
| | | | 380/2 |
| 2019/0305973 A1 | 10/2019 | Dewan | |
| 2021/0135887 A1* | 5/2021 | Plusquellic | H04L 9/3278 |
| 2021/0194707 A1* | 6/2021 | Aronson | G06F 21/44 |

OTHER PUBLICATIONS

On the Entropy of Physically Unclonable Functions, published 2015, Rioul (Year:2016).
Efficient Fuzzy Extractor Implementations for PUF Based Authentication, by Wen (Year: 2017).

* cited by examiner

400

```
┌─────────────────────────────────────────────────────┐
│ GENERATE, DURING AN ENROLLMENT PROCESS CONDUCTED IN A│
│   CONTROLLED ENVIRONMENT, A DARK BIT MASK COMPRISING A│
│      PLURALITY OF STATE INFORMATION VALUES DERIVED FROM A│
│   PLURALITY OF ENTROPY SOURCES AT A PLURALITY OF OPERATING│
│         CONDITIONS FOR AN ELECTRONIC DEVICE           │
│                         410                          │
└─────────────────────────────────────────────────────┘
                           │
                           ▼
┌─────────────────────────────────────────────────────┐
│    USE AT LEAST A PORTION OF THE PLURALITY OF STATE  │
│   INFORMATION VALUES TO GENERATE A SET OF CHALLENGE- │
│  RESPONSE PAIRS FOR USE IN AN AUTHENTICATION PROCESS FOR│
│                  THE ELECTRONIC DEVICE               │
│                         415                          │
└─────────────────────────────────────────────────────┘
                           │
                           ▼
┌─────────────────────────────────────────────────────┐
│  SELECT, FROM THE PLURALITY OF STATE INFORMATION VALUES, A│
│   SET OF STATE INFORMATION VALUES FROM ENTROPY SOURCES│
│  THAT EXHIBIT A STABLE RESPONSE AT THE PLURALITY OF DIFFERENT│
│   OPERATING CONDITIONS FOR THE ELECTRONIC DEVICE AND FROM│
│   ENTROPY SOURCES THAT EXHIBIT AN UNSTABLE RESPONSE AT ONE│
│    OR MORE OPERATING CONDITIONS FOR THE ELECTRONIC DEVICE│
│                         420                          │
└─────────────────────────────────────────────────────┘
                           │
                           ▼
┌─────────────────────────────────────────────────────┐
│      USE THE SET OF CHALLENGE-RESPONSE PAIRS IN AN   │
│   AUTHENTICATION PROCEDURE FOR THE ELECTRONIC DEVICE │
│                         425                          │
└─────────────────────────────────────────────────────┘
                           │
                           ▼
┌─────────────────────────────────────────────────────┐
│  GENERATE A SET OF CHALLENGE-RESPONSE PAIRS FROM THE SET│
│           OF STATE INFORMATION VALUES                │
│                         430                          │
└─────────────────────────────────────────────────────┘
                           │
                           ▼
┌─────────────────────────────────────────────────────┐
│  USE, IN THE AUTHENTICATION PROCESS, CHALLENGE-RESPONSE│
│     PAIRS GENERATED FROM ENTROPY SOURCES THAT EXHIBIT A│
│    STABLE RESPONSE AT THE PLURALITY OF DIFFERENT OPERATING│
│   CONDITIONS FOR THE ELECTRONIC DEVICE AND FROM ENTROPY│
│  SOURCES THAT EXHIBIT AN UNSTABLE RESPONSE AT ONE OR MORE│
│      OPERATING CONDITIONS FOR THE ELECTRONIC DEVICE. │
│                         435                          │
└─────────────────────────────────────────────────────┘
```

FIG. 4A

SECURE PUF-BASED DEVICE AUTHENTICATION USING ADVERSARIAL CHALLENGE SELECTION

CLAIM TO PRIORITY

This Application is a continuation of and claims the benefit of and priority to U.S. application Ser. No. 17/132,387, entitled SECURE PUF-BASED DEVICE AUTHENTICATION USING ADVERSARIAL CHALLENGE SELECTION, by Vikram Suresh, et al., filed Dec. 23, 2020, the entire contents of which are incorporated herein by reference.

BACKGROUND

Physically Unclonable Functions (PUFs) are emerging as attractive solutions for low-cost device authentication which does not require computationally expensive public key cryptography. PUFs harness manufacturing process variations to provide a unique device-specific response for a given input (known as challenge) to enable authentication over an insecure communication channel. A class of PUFs commonly referred to as a "strong PUF" provides an exponentially large number of Challenge-Response pairs (CRPs). This ensures a given CRP is used only once to eliminate the risk of replay attacks, while still supporting a large number of authentications per device. Although PUF CRPs are used only once to avoid replay attacks, a sophisticated malicious attacker can monitor the challenge response pairs and use machine learning or neural network models to learn the behavior of the PUF. A predictive model can then be used to clone a device, even if previously unused challenges are used for authentication.

Early PUF designs based on delay chains and ring oscillators were easily modelled using support vector machine and logistic regression. More sophisticated PUFs with non-linear behavior are still vulnerable to modelling attacks using genetic algorithm and deep neural network. Thus, additional PUF-based authentication techniques may find utility, e.g., in secure computing applications.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 4A is a simplified data flow diagram of at least one embodiment of a method for secure PUF-based authentication using adversarial challenge selection according to an embodiment.

DETAILED DESCRIPTION OF THE DRAWINGS

Figure 1:
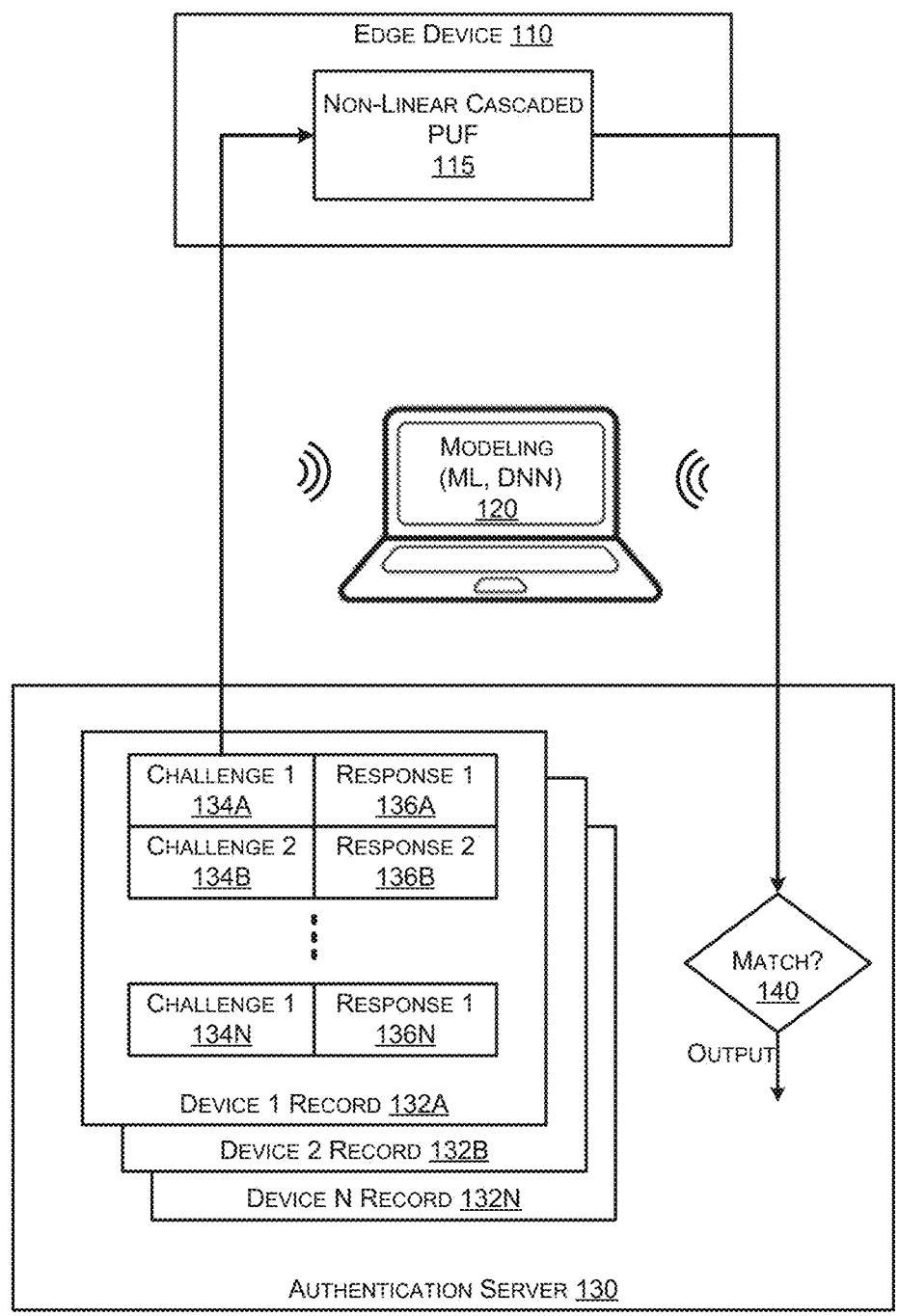
FIG. 1 is a simplified schematic diagram of an example system including an authentication system in accordance with an embodiment.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C) Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As described above, physically unclonable functions (PUFs) are emerging as attractive solutions for low-cost device authentication which does not require computationally expensive public key cryptography. PUFs harness manufacturing process variations to provide a unique device-specific response for a given input (known as challenge) to enable authentication over an insecure communication channel. A class of PUFs commonly referred to as a "strong PUF" provides an exponentially large number of Challenge-Response pairs (CRPs). This ensures a given CRP is used only once to eliminate the risk of replay attacks, while still supporting a large number of authentications per device. Although PUF CRPs are used only once to avoid replay attacks, a sophisticated malicious attacker can monitor the challenge response pairs and use machine learning or neural network models to learn the behavior of the PUF. A predictive model can then be used to clone a device, even if previously unused challenges are used for authentication.

Early PUF designs based on delay chains and ring oscillators were easily modelled using support vector machine and logistic regression. More sophisticated PUFs with non-linear behavior are still vulnerable to modelling attacks using genetic algorithm and deep neural network.

To address these and other issues, described herein are two stability-based adversarial challenge selection techniques which are rendered resistant to model-based attacks by (i) using unstable CRPs during device authentication to force an attacker to train the model on inaccurate responses and/or (ii) using unstable CRPs as part of the authentication requirement by requiring a specific portion of device responses to be incorrect. Techniques described herein utilize a stability-aware adversarial challenge selection process. During an enrollment process, the PUF device is characterized across a range of voltage and temperature values to identify unstable CRPs. These unstable CRPs are used during authentication to (i) to disrupt the machine learning model of an attacker; or (ii) increase the complexity of modelling by requiring incorrect responses as part of authentication.

Techniques described herein utilize the native instability of PUF circuits to improve resistance to machine-language (ML) based attack. No additional changes to the PUF circuit(s) are required, and response reliability is not degraded. Since the PUF characterization happens during the enrollment phase, there is no additional cost involved at the edge device to improve ML-based attack resistance. The overhead of stability-aware challenge selection may be managed by the resourceful authentication server. Furthermore, the proposed techniques are agnostic to PUF architecture and entropy source, making them extremely versatile for PUF-based authentication.

FIG. 1 is a simplified schematic diagram of an example system 100 including an authentication system in accordance with an embodiment. Referring to FIG. 1, in some examples, system 100 comprises an edge device 110 which is communicatively coupled to an authentication server 130. A detailed description of components of an authentication server 130 is provided with reference to FIG. 8, below.

In some examples, edge device 110 an electronic device such as a one or more components of a computing system. In other examples, edge device 110 may comprise an electronically activatable device such as an integrated circuit that is to be mounted on a credit card, identification card, or the like. Edge device 110 comprises one or more physically unclonable functions (PUFs) such as a non-linear cascaded PUF 115. A more detailed description of PUF 115 is provided with reference to FIG. 5 and FIG. 6, below.

During the course of an enrollment process, authentication server 130 generates a large number of records including CRPs for each device that is enrolled with the authentication server. In the example depicted in FIG. 1, the authentication server 130 generates a first device record 132A that comprises a first challenge 134A stored in logical association with a first response 136A, a second challenge 134B stored in logical association with a second response 136B, and so on up to an Nth challenge 134N stored in logical association with an Nth response 136N. A second device record 132B contains a similar set of CRPs for the second device, and so on up to an Nth device record contains a similar set of CRPs for the Nth device. In subsequent authentication processes, the authentication server 130 uses the CRPs for a device to securely authenticate the device without the need for computationally expensive public key cryptography, i.e., over an insecure communication channel.

In some examples, PUF devices may be constructed using delay chains, SRAM bitcells, or cross-coupled inverters as an entropy source. While the enrollment process is conducted in a controlled environment, the authentication process may take place in an uncontrolled environment which exhibits a wide range of voltage and/or temperature conditions. This variation in the operating environment introduces error in the responses generated on the PUF device, resulting in mismatch with a locally computed golden value generated under standardized conditions. In the adversarial challenge technique, this native instability in the PUF response may be harnessed to inhibit ML-based attacks.

Figure 2:
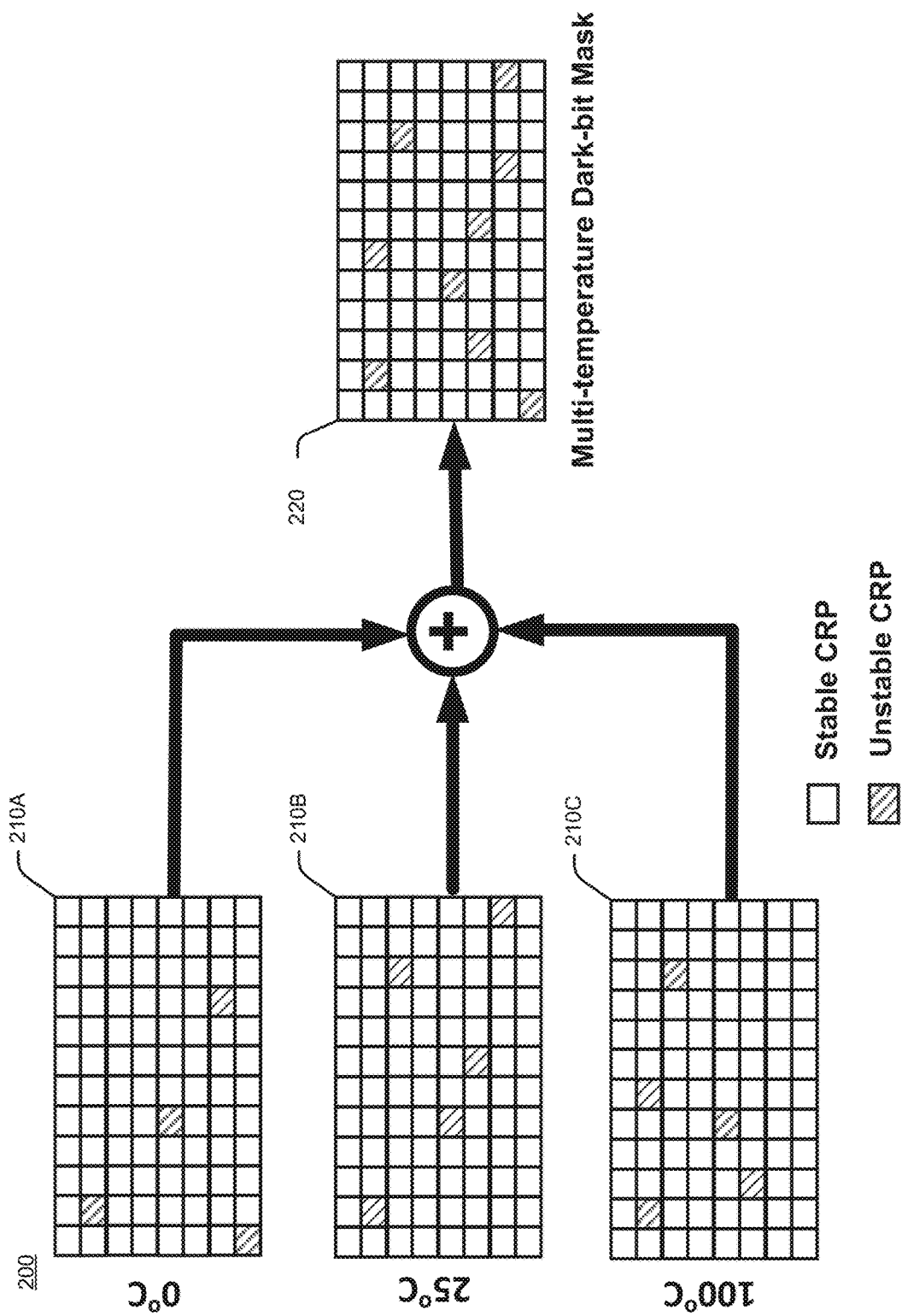
FIG. 2 is a simplified block diagram illustrating generation of a multi-voltage/multi-temperature dark-bit mask in accordance with an embodiment.

FIG. 2 is a simplified block diagram illustrating generation of a multi-voltage/multi-temperature dark-bit mask in accordance with an embodiment. In some examples, during PUF enrollment, a dark-bit (DB) mask is generated at a variety of different voltages and/or temperatures. The DB masks at different temperatures and/or voltages are combined to generate a single multi-voltage/temperature dark-bit mask for each PUF device. Each cell in the bitmask represents an entropy source which may be implemented using, e.g., delay chains, SRAM bitcells, or cross-coupled inverters as an entropy source.

Referring to FIG. 2, in one example a first dark bitmask 210A may be generated at a first temperature of zero degrees Celsius (0° C.), a second dark bitmask 210B may be generated at a second temperature of 25 degrees Celsius (25° C.), and a third dark bitmask 210C may be generated at a third temperature of 100 degrees Celsius (100° C.). In some examples the three dark bitmasks 210A, 210B, 210C may comprise state information that indicates whether a challenge-response pair (CRP) generated from the value of any given cell in the PUF device is stable at the given temperature and/or voltage or whether the CRP is unstable at the given temperature and/or voltage. In FIG. 2, cells which produce stable CRP values are indicated as blank cells while cells which produce unstable CRP values are indicated with diagonal shading. The three dark bitmasks 210A, 210B, 210C may be combined to generate a multi-temperature dark bitmask 220. During PUF authentication, this multi-voltage/temperature dark-bit mask 220 may be for adversarial challenge selection using techniques described in FIGS. 3A-3B and FIGS. 4A-4B.

Figure 3A:
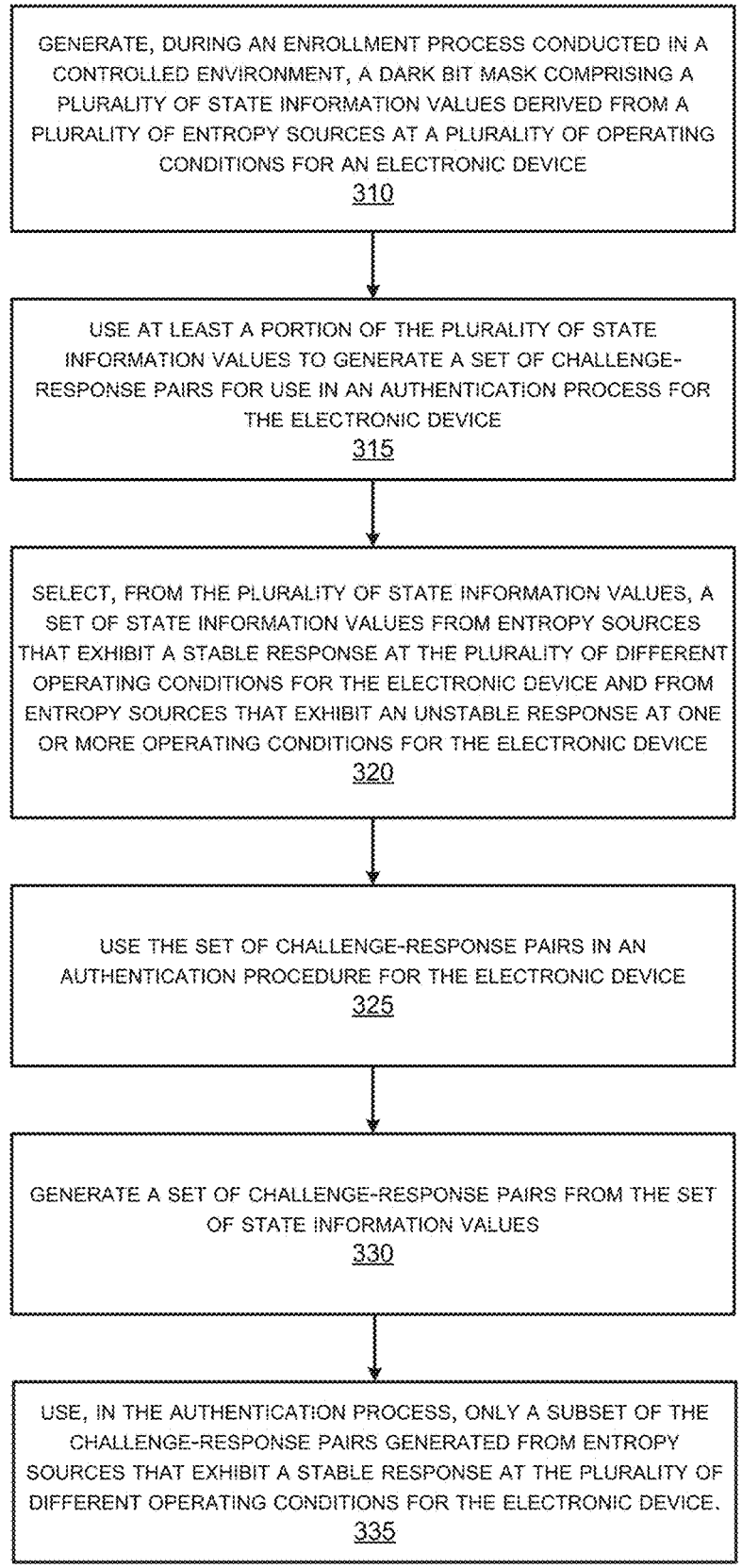
FIG. 3A is a simplified data flow diagram of at least one embodiment of a method for secure PUF-based authentication using adversarial challenge selection according to an embodiment.
Figure 3B:
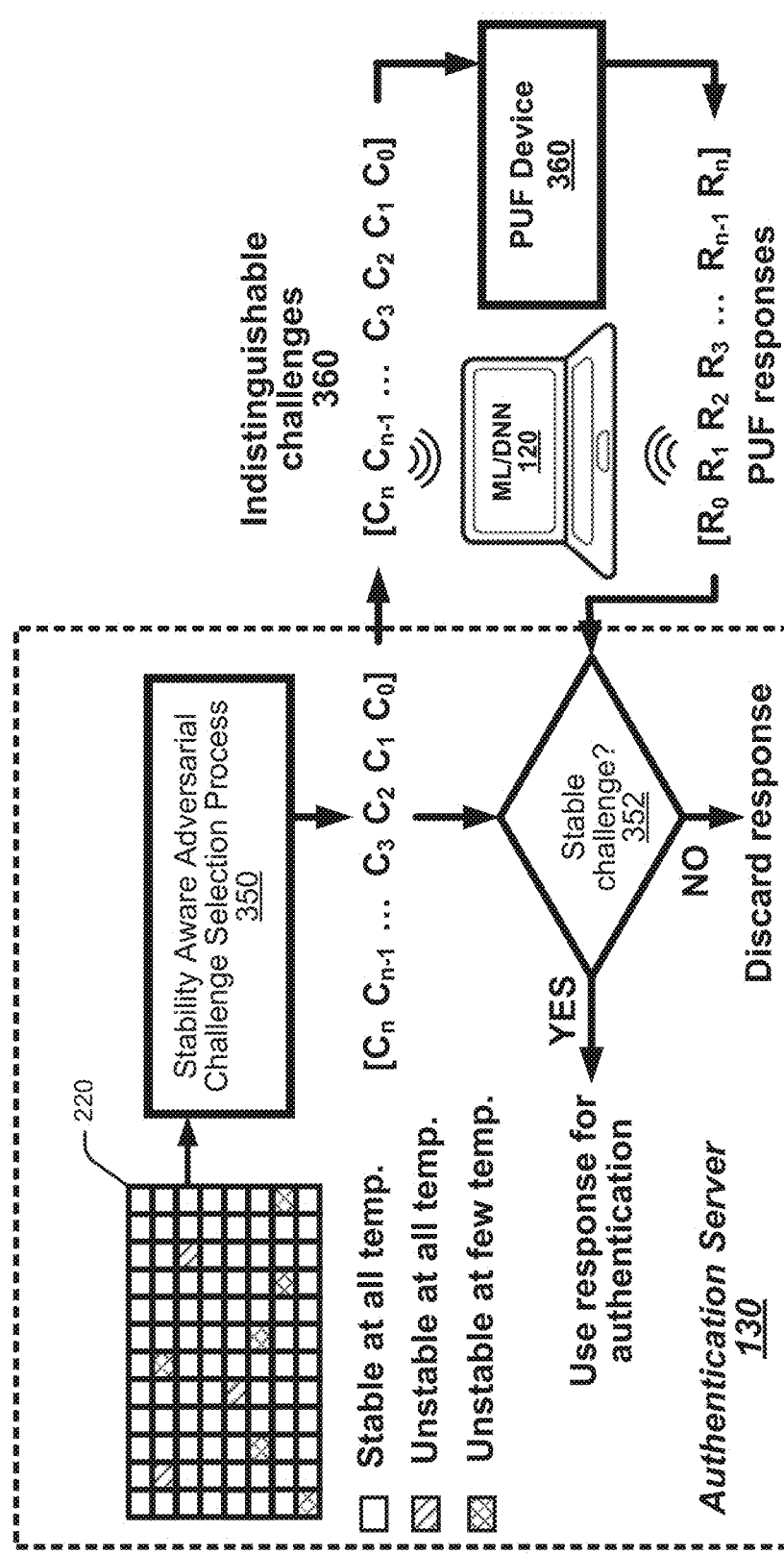
FIG. 3B is a simplified block diagram of at least one embodiment of a method for secure PUF-based authentication using adversarial challenge selection according to an embodiment.

FIGS. 3A-3B illustrate a technique 300 which implements adversarial challenge selection in which CRPs which produce unstable responses are rejected, i.e., not used in the authentication process. FIG. 3A is a simplified data flow diagram of at least one embodiment of a method 30 for secure PUF-based authentication using adversarial challenge selection according to an embodiment. FIG. 3B is a simplified block diagram of at least one embodiment of a method for secure PUF-based authentication using adversarial challenge selection according to an embodiment.

Referring to FIGS. 3A-3B, at operation 310 a dark bit mask is generated during an enrollment process. In some examples the dark bit mask comprises a plurality of state information values derived from a plurality of entropy sources at a plurality of operating conditions for an electronic device. In some examples this dark bitmask 220 may be generated as described with reference to FIG. 2.

At operation 315 at least a portion of the plurality of state information values in the dark bitmask 220 are used to generate a set of challenge-response pairs for use in an authentication process for the electronic device. In some examples at least a portion of the state information values of the dark bitmask 220 are input to a stability aware adversarial challenge selection process 350, which generates a set of challenges $[C_n, C_{n-1} \ldots C_3, C_2, C_1, C_0]$ that includes state information from entropy sources that generate stable responses and from entropy sources that generate unstable responses. Thus, at operation 320 a set of state information values from entropy sources that exhibit a stable response at the plurality of different operating conditions for the electronic device and from entropy sources that exhibit an unstable response at one or more operating conditions for the electronic device are selected for use in an authentication procedure (operation 325). In some examples, the set of challenges $[C_n, C_{n-1} \ldots C_3, C_2, C_1, C_0]$ is used by the authentication server to generate (operation 330) a corresponding set of responses $[R_n, R_{n-1} \ldots R_3, R_2, R_1, R_0]$ to generate challenge-response pairs (CRPs) that include both stable CRPs and unstable CRPs.

In some examples only the challenge-response pairs (CRPs) that originated from entropy sources that generate a stable response are used in the authentication process. Thus, at operation 335 the authentication server uses, in the authentication process, only a subset of the challenge-response pairs generated from entropy sources that exhibit a stable response at the plurality of different operating conditions for the electronic device. Referring to FIG. 3B, at decision box 352 the authentication server determines whether a particular challenge is a stable challenge, i.e., if it generates a stable response. If a particular challenge is stable, then the authentication server 130 uses the response for authentication. By contrast, if the challenge is not stable then the authentication server 130 discards the response and does not use it for authentication.

As illustrated in FIG. 3B, a malicious actor attempting to snoop into the CRP exchange between the PUF device 360 and the authentication server 130 cannot distinguish between a challenge that generates a stable response and a challenge that generates an unstable response. Thus, the malicious actor will train the predictive model generated by the machine language deep neural network 120 using both stable challenges and unstable challenges, which significantly impedes the predictive model from generating useful results.

Figure 4B:
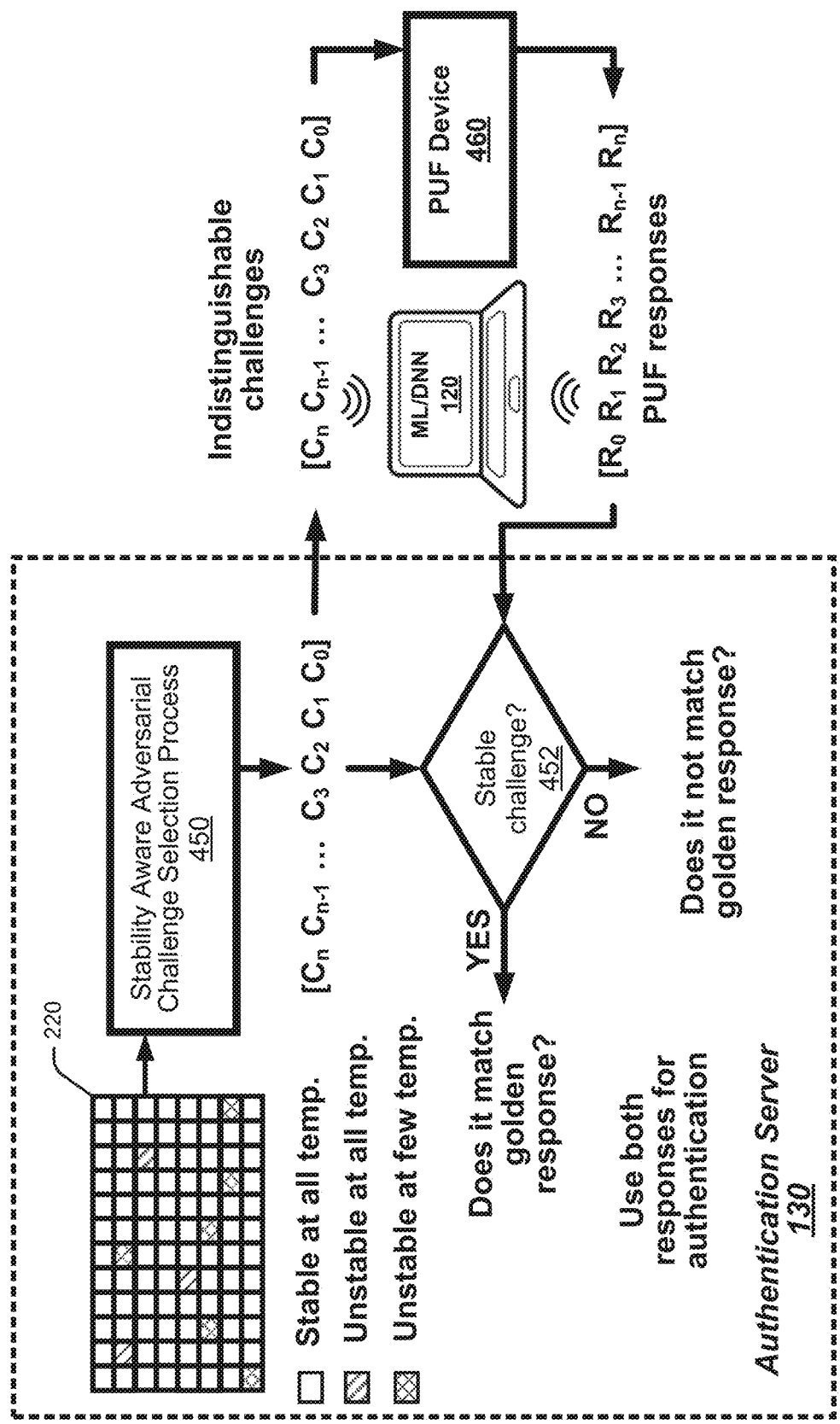
FIG. 4B is a simplified block diagram of at least one embodiment of a method for secure PUF-based authentication using adversarial challenge selection according to an embodiment.

FIGS. 4A-4B illustrate a technique 400 which implements adversarial challenge selection in which CRPs which produce unstable responses are utilized in the authentication process. FIG. 4A is a simplified data flow diagram of at least one embodiment of a method for secure PUF-based authentication using adversarial challenge selection according to an embodiment. FIG. 4B is a simplified block diagram of at least one embodiment of a method for secure PUF-based authentication using adversarial challenge selection according to an embodiment.

Referring to FIGS. 4A-4B, at operation 410 a dark bit mask is generated during an enrollment process. In some examples the dark bit mask comprises a plurality of state information values derived from a plurality of entropy sources at a plurality of operating conditions for an electronic device. In some examples this dark bitmask 220 may be generated as described with reference to FIG. 2.

At operation 415 at least a portion of the plurality of state information values in the dark bitmask 220 are used to generate a set of challenge-response pairs for use in an authentication process for the electronic device. In some examples at least a portion of the state information values of the dark bitmask 220 are input to a stability aware adversarial challenge selection process 450, which generates a set of challenges $[C_n, C_{n-1} \ldots C_3, C_2, C_1, C_0]$ that includes state information from entropy sources that generate stable responses and from entropy sources that generate unstable responses. Thus, at operation 420 a set of state information values from entropy sources that exhibit a stable response at the plurality of different operating conditions for the electronic device and from entropy sources that exhibit an unstable response at one or more operating conditions for the electronic device are selected for use in an authentication procedure (operation 425). In some examples, the set of challenges $[C_n, C_{n-1} \ldots C_3, C_2, C_1, C_0]$ is used by the authentication server to generate (operation 330) a corresponding set of responses $[R_n, R_{n-1} \ldots R_3, R_2, R_1, R_0]$ to generate challenge-response pairs (CRPs) that include both stable CRPs and unstable CRPs.

In some examples the authentication process uses the challenge-response pairs (CRPs) that originated from entropy sources that generate a stable response and CRPs that originated from entropy sources that generate an unstable response. Thus, at operation 435 the authentication server uses, in the authentication process, challenge-response pairs generated from entropy sources that exhibit a stable response at the plurality of different operating conditions for the electronic device and from entropy sources that exhibit an unstable response at one or more operating conditions for the electronic device. Referring to FIG. 4B, at decision box 452 the authentication server determines whether a particular challenge is a stable challenge, i.e., if it generates a stable response.

In some examples the authentication protocol may be adapted to require a pre-determined percentage (if not all) of the responses that result from an unstable CRPs to not match with the golden response in order to pass authentication. As illustrated in FIG. 4B, a malicious actor attempting to snoop into the CRP exchange between the PUF device 460 and the authentication server 130 cannot distinguish between a challenge that generates a stable response and a challenge that generates an unstable response. Since the unstable responses are also used for authentication, the malicious actor will need to model not just the stable behavior of the PUF, but also the unstable behavior across a large operating range, which significantly impedes the predictive model from generating useful results.

Instead of ignoring all challenges that are stable/unstable only in few operating conditions, in some examples the authentication server may also select challenges from a non-overlapping group of unstable challenges. For instance, the server may choose a challenge C1 (and a corresponding response R1) that is stable at 25° C., but unstable at 100° C.

It can also choose a second challenge C2 (and a corresponding response R2) that is unstable at 25° C., but stable at 100° C. So, depending on the operating temperature on the in-field PUF device, either R1 is stable or R2 is stable. It is not expected that both R1, R2 are stable or both R1, R2 are unstable. This adds an additional characteristic for an attacker to learn, making modelling attacks more challenging.

Figure 5:
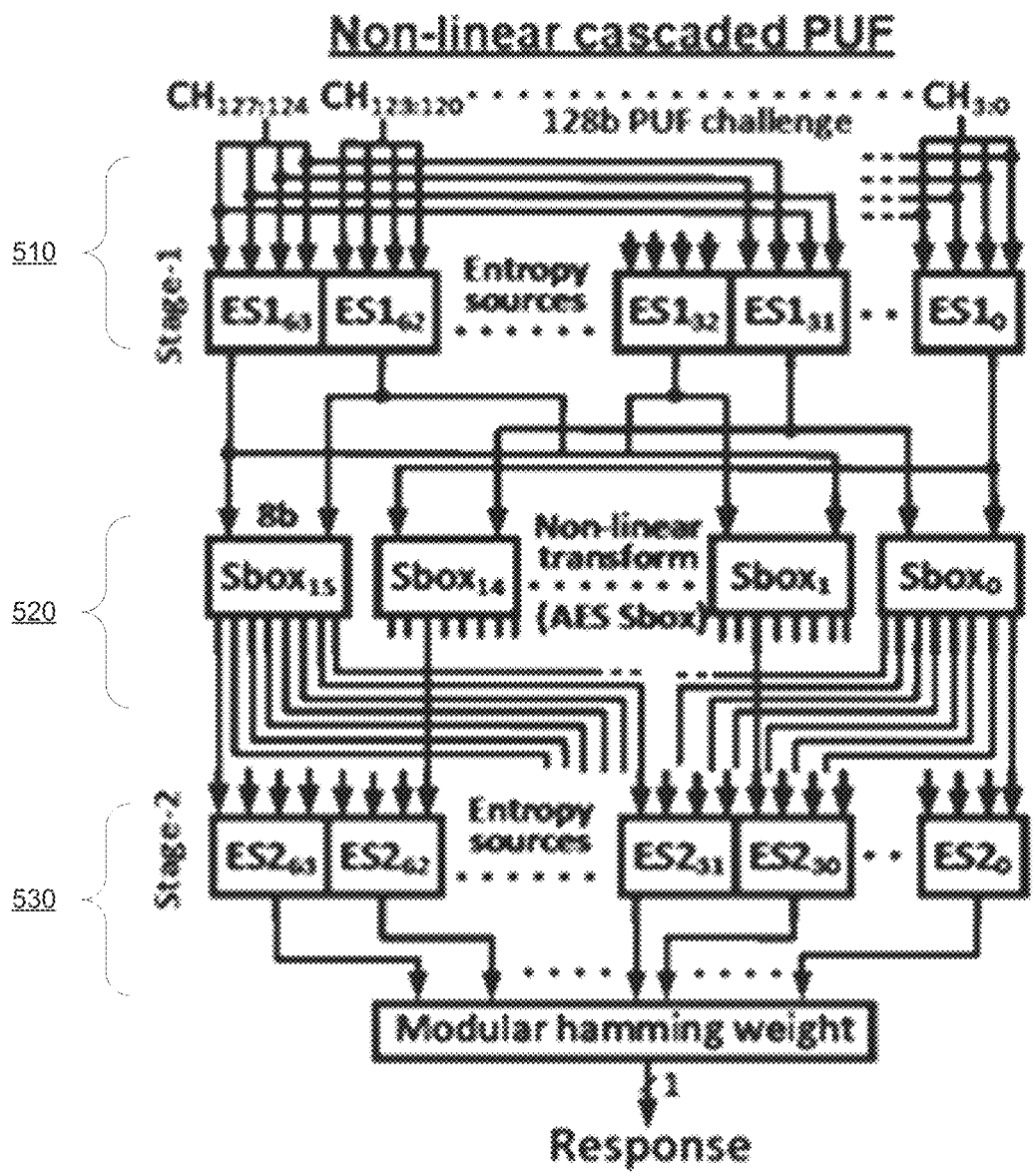
FIG. 5 is a simplified block diagram of a non-linear cascaded PUF architecture according to an embodiment.

FIG. 5 is a simplified block diagram of a non-linear cascaded PUF 500 architecture according to an embodiment. Referring to FIG. 5, in one example the non-linear cascaded PUF 500 consists of a first stage 510 of 64 entropy sources ($ES1_{63}$, $ES1_{62}$ . . . , $ES1_{32}$, $ES1_{31}$ . . . $ES1_0$) and a second stage 530 of 64 entropy sources ($ES2_{63}$, $ES2_{62}$ . . . , $ES2_{32}$, $ES2_{31}$ . . . $ES2_0$) cascaded via a non-linear transformation 520. In the example depicted in FIG. 5 the non-linear transformation may be implemented using an advanced encryption standard (AES) substitute-box (Sbox) operation. The input challenge bits (CH) configure the entropy source in the first stage 510. The output of the first stage 510 is non-linearly transformed by the non-linear transformation 520 before being applied as the challenge to the second stage 530.

Figure 6:
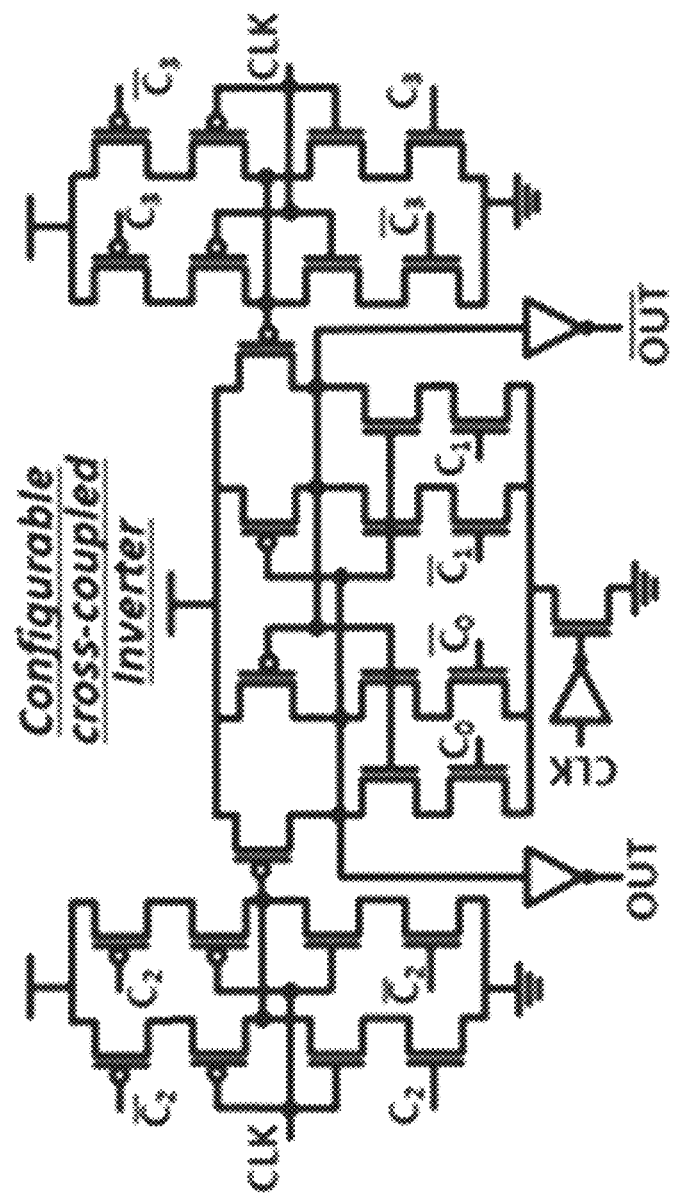
FIG. 6 is a simplified diagram of at least one embodiment of a configurable cross-coupled inverter according to an embodiment.

In one example the entropy source may comprise cross-coupled inverter-pair with two configurable NMOS legs and two configurable clock delays. FIG. 6 is a simplified diagram of at least one embodiment of a configurable cross-coupled inverter 600 according to an embodiment. In some examples, two challenge bits are used to generate one-hot select signals to enable one of the NMOS legs in each inverter, while two additional challenge bits select the delay cell on the clock path, providing 16 unique response bits per entropy source.

Figure 7:
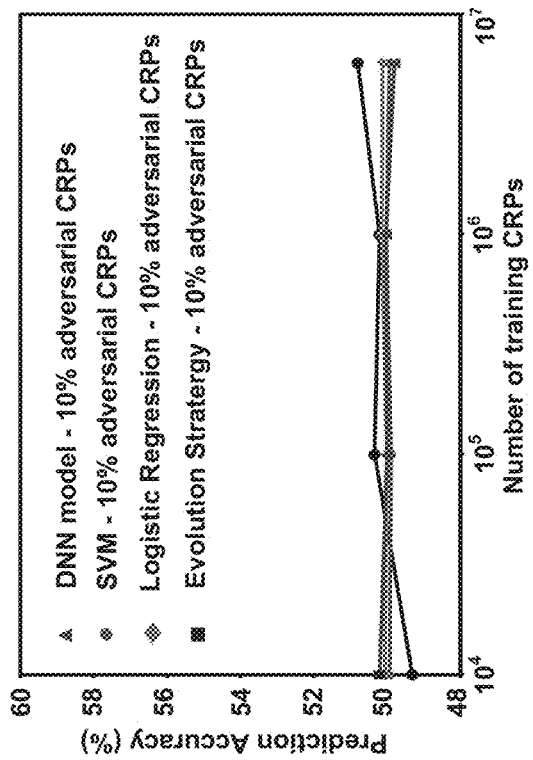
FIG. 7 is an illustration of a model attack using a 128-bit PUF, according to an embodiment.
Figure 7:
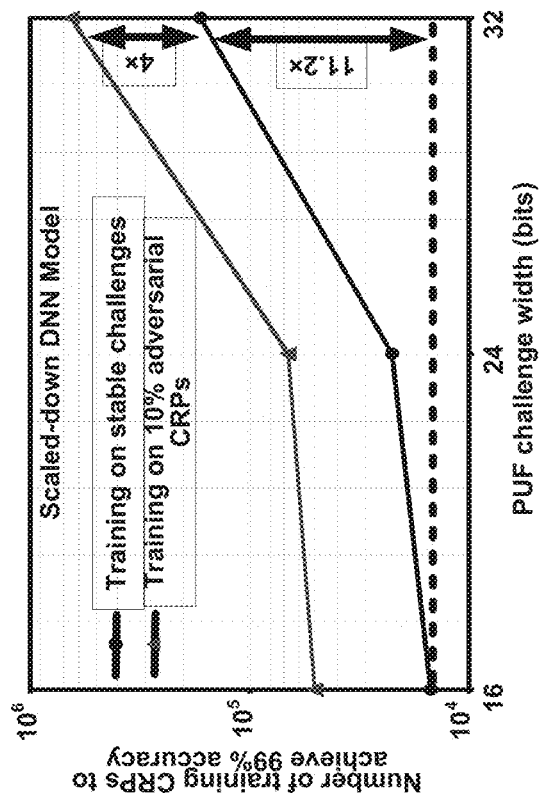

FIG. 7 is an illustration 700 of a model attack using a 128-bit PUF, according to an embodiment. Modelling attack was performed using a 6-layer DNN with 4096 neurons per layer on a scaled down version of the PUF with 16, 24 and 32-bit challenges, where adversarial challenge selection with response rejection showed 4× increase in modelling complexity. Attack on the full 128-bit PUF using DNN, Support Vector Machine, Logistic Regression and Evolution Strategy shows that adversarial challenge selection with response rejection limits prediction accuracy to 50%, which is approximately equivalent to a random guess.

Exemplary Computing Architecture

Figure 8:
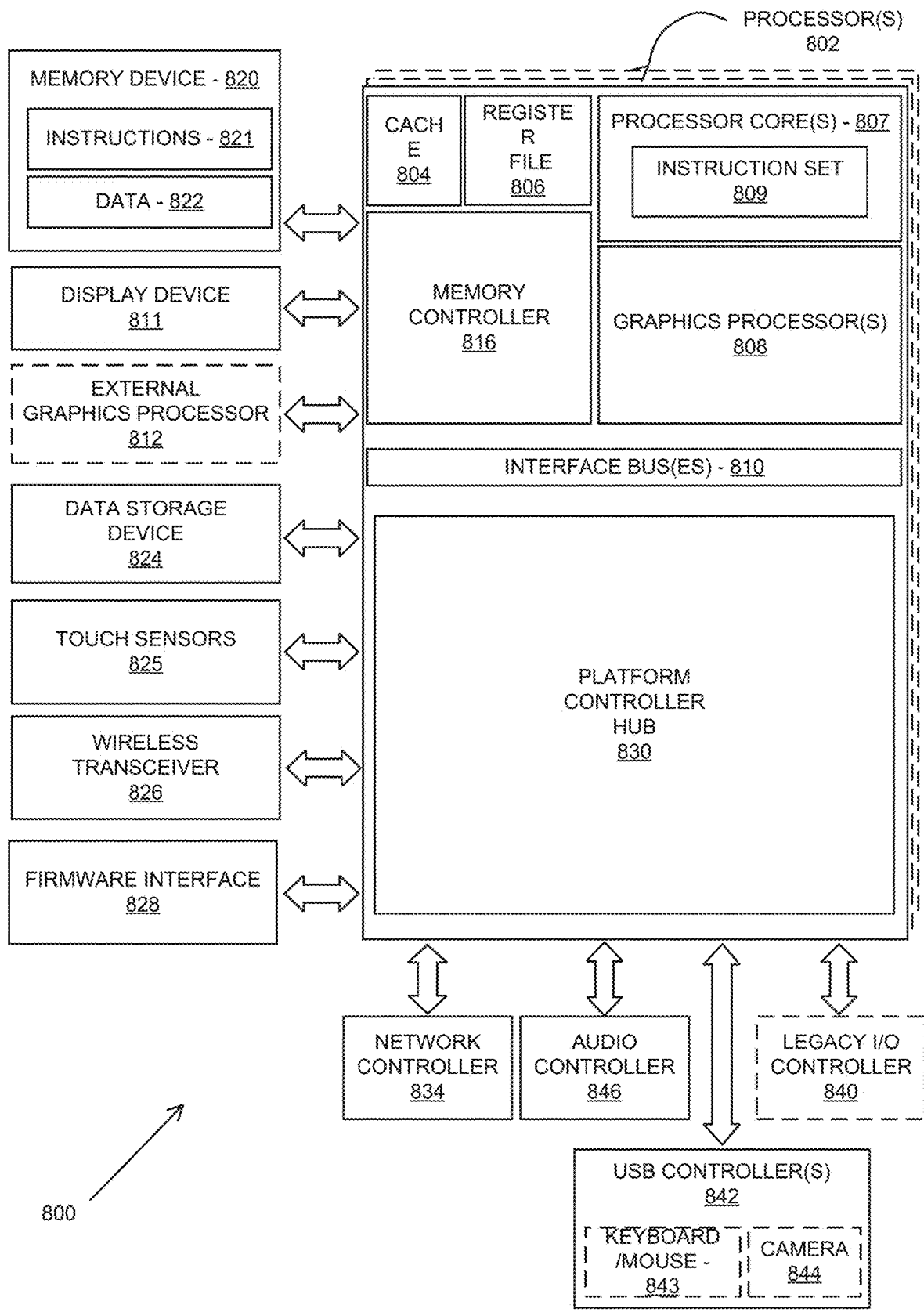
FIG. 8 is a block diagram illustrating a computing architecture which may be adapted to provide a method for secure PUF-based authentication using adversarial challenge selection according to an embodiment.

FIG. 8 is a block diagram illustrating a computing architecture which may be adapted to implement a secure address translation service using a permission table (e.g., HPT 135 or HPT 260) and based on a context of a requesting device in accordance with some examples. The embodiments may include a computing architecture supporting one or more of (i) verification of access permissions for a translated request prior to allowing a memory operation to proceed; (ii) prefetching of page permission entries of an HPT responsive to a translation request; and (iii) facilitating dynamic building of the HPT page permissions by system software as described above.

In various embodiments, the computing architecture 800 may comprise or be implemented as part of an electronic device. In some embodiments, the computing architecture 800 may be representative, for example, of a computer system that implements one or more components of the operating environments described above. In some embodiments, computing architecture 800 may be representative of one or more portions or components in support of a secure address translation service that implements one or more techniques described herein.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include, or be incorporated within, a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 814. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, one or more processor(s) 802 are coupled with one or more interface bus(es) 810 to transmit communication signals such as address, data, or control signals between processor 802 and other components in the system. The interface bus 810, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 802 include an integrated memory controller 816 and a platform controller hub 830. The memory controller 816 facilitates communication between a memory device and other components of the system 800, while the platform controller hub (PCH) 830 provides connections to I/O devices via a local I/O bus.

Memory device 820 can be a dynamic random-access memory (DRAM) device, a static random-access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 execute an application or process. Memory controller hub 816 also couples with an optional external graphics processor 812, which may communicate with the one or more graphics processors 808 in processors 802 to perform graphics and media operations. In some embodiments a display device 811 can connect to the processor(s) 802. The display device 811 can be one or more of an internal display device, as in a mobile electronic device or a laptop device or an external display device attached via a display interface (e.g., DisplayPort, etc.). In one embodiment the display device 811 can be a head mounted display (HMD) such as a stereoscopic display device for use in virtual reality (VR) applications or augmented reality (AR) applications.

In some embodiments the platform controller hub 830 enables peripherals to connect to memory device 820 and processor 802 via a high-speed I/O bus. The I/O peripherals include, but are not limited to, an audio controller 846, a network controller 834, a firmware interface 828, a wireless transceiver 826, touch sensors 825, a data storage device 824 (e.g., hard disk drive, flash memory, etc.). The data storage device 824 can connect via a storage interface (e.g., SATA) or via a peripheral bus, such as a Peripheral Component Interconnect bus (e.g., PCI, PCI Express). The touch sensors 825 can include touch screen sensors, pressure sensors, or fingerprint sensors. The wireless transceiver 826 can be a Wi-Fi transceiver, a Bluetooth transceiver, or a mobile network transceiver such as a 3G, 4G, Long Term Evolution (LTE), or 5G transceiver. The firmware interface 828 enables communication with system firmware, and can be, for example, a unified extensible firmware interface (UEFI). The network controller 834 can enable a network connection to a wired network. In some embodiments, a high-performance network controller (not shown) couples with the interface bus 810. The audio controller 846, in one embodiment, is a multi-channel high definition audio controller. In one embodiment the system 800 includes an optional legacy I/O controller 840 for coupling legacy (e.g., Personal System 2 (PS/2)) devices to the system. The platform controller hub 830 can also connect to one or more Universal Serial Bus (USB) controllers 842 connect input devices, such as keyboard and mouse 843 combinations, a camera 844, or other USB input devices.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Example 1 is method comprising generating, during an enrollment process conducted in a controlled environment, a dark bit mask comprising a plurality of state information values derived from a plurality of entropy sources at a plurality of operating conditions for an electronic device and using at least a portion of the plurality of state information values to generate a set of challenge-response pairs for use in an authentication process for the electronic device.

Example 2 includes the subject matter of Example 1, wherein the plurality of entropy sources comprises at least one of one or more delay chains, one or more static random access memory (SRAM) memory bitcells, or one or more cross-coupled inverters.

Example 3 includes the subject matter of Examples 1-2, wherein the plurality of operating conditions comprises at least one of one or more operating voltages, one or more operating temperatures, or one or more age-related parameters.

Example 4 includes the subject matter of Examples 1-3, further comprising selecting, from the plurality of state information values, a set of state information values from entropy sources that exhibit a stable response at the plurality of different operating conditions for the electronic device and from entropy sources that exhibit an unstable response at one or more operating conditions for the electronic device, and using the set of challenge-response pairs in an authentication procedure for the electronic device.

Example 5 includes the subject matter of Examples 1-4, wherein the authentication procedure generates a set of challenge-response pairs from the set of state information values, and uses, in the authentication process, only a subset of the challenge-response pairs generated from entropy sources that exhibit a stable response at the plurality of different operating conditions for the electronic device.

Example 6 includes the subject matter of Examples 1-5, wherein the authentication procedure generates a set of challenge-response pairs from the set of state information values; and uses, in the authentication process, challenge-response pairs generated from entropy sources that exhibit a stable response at the plurality of different operating conditions for the electronic device and from entropy sources that exhibit an unstable response at one or more operating conditions for the electronic device.

Example 7 includes the subject matter of Examples 1-6 wherein authentication procedure requires that at least a portion of the challenge-response pairs generated include a generated response that does not match an expected response.

Example 8 is an apparatus, comprising a processor; and a computer readable memory comprising instructions which, when executed by the processor, cause the processor to generate, during an enrollment process conducted in a controlled environment, a dark bit mask comprising a plurality of state information values derived from a plurality of entropy sources at a plurality of operating conditions for an electronic device and use at least a portion of the plurality of state information values to generate a set of challenge-response pairs for use in an authentication process for the electronic device.

Example 9 includes the subject matter of Example 8, wherein the plurality of entropy sources comprises at least one of one or more delay chains, one or more static random access memory (SRAM) memory bitcells, or one or more cross-coupled inverters.

Example 10 includes the subject matter of Examples 8-9, wherein the plurality of operating conditions comprises at least one of one or more operating voltages, one or more operating temperatures, or one or more age-related parameters.

Example 11 includes the subject matter of Examples 8-10, select, from the plurality of state information values, a set of state information values from entropy sources that exhibit a stable response at the plurality of different operating conditions for the electronic device and from entropy sources that exhibit an unstable response at one or more operating conditions for the electronic device, and use the set of challenge-response pairs in an authentication procedure for the electronic device.

Example 12 includes the subject matter of Examples 8-11, further comprising instructions which, when executed by the processor, cause the processor to generate a set of challenge-response pairs from the set of state information values; and use, in the authentication process, only a subset of the challenge-response pairs generated from entropy sources that exhibit a stable response at the plurality of different operating conditions for the electronic device.

Example 13 includes the subject matter of Examples 8-12, the computer readable memory comprising instructions which, when executed by the processor, cause the processor to generate a set of challenge-response pairs from the set of state information values; and use, in the authentication process, challenge-response pairs generated from entropy sources that exhibit a stable response at the plurality of different operating conditions for the electronic device and from entropy sources that exhibit an unstable response at one or more operating conditions for the electronic device Example 14 includes the subject matter of Examples 8-13, wherein authentication procedure requires that at least a portion of the challenge-response pairs generated include a generated response that does not match an expected response.

Example 15 is one or more computer-readable storage media comprising instructions stored thereon that, in response to being executed, cause a computing device to generate, during an enrollment process conducted in a controlled environment, a dark bit mask comprising a plurality of state information values derived from a plurality of entropy sources at a plurality of operating conditions for an electronic device and use at least a portion of the plurality of state information values to generate a set of challenge-response pairs for use in an authentication process for the electronic device.

Example 16 includes the subject matter of Examples 13-15, wherein the plurality of entropy sources comprises at least one of one or more delay chains, one or more static random access memory (SRAM) memory bitcells, or one or more cross-coupled inverters.

Example 17 includes the subject matter of Examples 15-16, wherein the plurality of operating conditions comprises at least one of one or more operating voltages, one or more operating temperatures, or one or more age-related parameters.

Example 18 includes the subject matter of Examples 15-17, further comprising instructions stored thereon that, in response to being executed, cause the computing device to select, from the plurality of state information values, a set of state information values from entropy sources that exhibit a stable response at the plurality of different operating conditions for the electronic device and from entropy sources that exhibit an unstable response at one or more operating conditions for the electronic device; and use the set of challenge-response pairs in an authentication procedure for the electronic device.

Example 19 includes the subject matter of Examples 15-18, further comprising instructions stored thereon that, in response to being executed, cause the computing device to generate a set of challenge-response pairs from the set of state information values; and use, in the authentication process, only a subset of the challenge-response pairs generated from entropy sources that exhibit a stable response at the plurality of different operating conditions for the electronic device.

Example 20 includes the subject matter of Examples 15-19, further comprising instructions stored thereon that, in response to being executed, cause the computing device to generate a set of challenge-response pairs from the set of state information values; and use, in the authentication process, challenge-response pairs generated from entropy sources that exhibit a stable response at the plurality of different operating conditions for the electronic device and from entropy sources that exhibit an unstable response at one or more operating conditions for the electronic device.

Example 21 includes the subject matter of Examples 15-20, wherein authentication procedure requires that at least a portion of the challenge-response pairs generated include a generated response that does not match an expected response.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A method comprising:
    using at least a portion of a plurality of state information values derived from a plurality of entropy sources at a plurality of operating conditions for an electronic device to generate a set of challenge-response pairs for use in an authentication process for the electronic device;
    selecting, from the plurality of state information values, a set of state information values from one or more entropy sources that exhibit a stable response at the plurality of different operating conditions for the electronic device and from one or more entropy sources that exhibit an unstable response at one or more operating conditions for the electronic device; and
    using the set of challenge-response pairs in an authentication procedure for the electronic device;
        generating, during an enrollment process conducted in a controlled environment, a dark bit mask comprising a plurality of state information values derived from a plurality of entropy sources at a plurality of operating conditions for an electronic device; and
        using at least a portion of the plurality of state information values to generate a set of challenge-response pairs for use in an authentication process for the electronic device.

2. The method of claim 1, wherein the plurality of entropy sources comprises at least one of:
    one or more delay chains;
    one or more static random access memory (SRAM) memory bitcells; or
    one or more cross-coupled inverters.

3. The method of claim 1, wherein the plurality of operating conditions comprises at least one of:
    one or more operating voltages;
    one or more operating temperatures; or
    one or more age-related parameters.

4. The method of claim 1, wherein the authentication procedure:
    generates a set of challenge-response pairs from the set of state information values; and
    uses, in the authentication process, only a subset of the challenge-response pairs generated from entropy sources that exhibit a stable response at the plurality of different operating conditions for the electronic device.

5. The method of claim 1, wherein the authentication procedure:
    generates a set of challenge-response pairs from the set of state information values; and
    uses, in the authentication process, challenge-response pairs generated from entropy sources that exhibit a stable response at the plurality of different operating conditions for the electronic device and from entropy sources that exhibit an unstable response at one or more operating conditions for the electronic device.

6. The method of claim 5, wherein authentication procedure requires that at least a portion of the challenge-response pairs generated include a generated response that does not match an expected response.

7. An apparatus comprising:
a processor; and
a computer readable memory comprising instructions which, when executed by the processor, cause the processor to:
use at least a portion of a plurality of state information values derived from a plurality of entropy sources at a plurality of operating conditions for an electronic device to generate a set of challenge-response pairs for use in an authentication process for the electronic device;
select, from the plurality of state information values, a set of state information values from one or more entropy sources that exhibit a stable response at the plurality of different operating conditions for the electronic device and from one or more entropy sources that exhibit an unstable response at one or more operating conditions for the electronic device; and
use the set of challenge-response pairs in an authentication procedure for the electronic device.

8. The apparatus of claim 7, wherein the plurality of entropy sources comprises at least one of:
one or more delay chains;
one or more static random access memory (SRAM) memory bitcells; or
one or more cross-coupled inverters.

9. The apparatus of claim 7, wherein the plurality of operating conditions comprises at least one of:
one or more operating voltages;
one or more operating temperatures; or
one or more age-related parameters.

10. The apparatus of claim 7, the computer readable memory comprising instructions which, when executed by the processor, cause the processor to:
generate a set of challenge-response pairs from the set of state information values; and
use, in the authentication process, only a subset of the challenge-response pairs generated from entropy sources that exhibit a stable response at the plurality of different operating conditions for the electronic device.

11. The apparatus of claim 7, the computer readable memory comprising instructions which, when executed by the processor, cause the processor to:
generate a set of challenge-response pairs from the set of state information values; and
use, in the authentication process, challenge-response pairs generated from entropy sources that exhibit a stable response at the plurality of different operating conditions for the electronic device and from entropy sources that exhibit an unstable response at one or more operating conditions for the electronic device.

12. The apparatus of claim 11, wherein authentication procedure requires that at least a portion of the challenge-response pairs generated include a generated response that does not match an expected response.

13. One or more computer-readable storage media comprising instructions stored thereon that, in response to being executed, cause a computing device to:
use at least a portion of a plurality of state information values derived from a plurality of entropy sources at a plurality of operating conditions for an electronic device to generate a set of challenge-response pairs for use in an authentication process for the electronic device;
select, from the plurality of state information values, a set of state information values from one or more entropy sources that exhibit a stable response at the plurality of different operating conditions for the electronic device and from one or more entropy sources that exhibit an unstable response at one or more operating conditions for the electronic device; and
use the set of challenge-response pairs in an authentication procedure for the electronic device.

14. The one or more computer-readable storage media of claim 13, wherein the plurality of entropy sources comprises at least one of:
one or more delay chains;
one or more static random access memory (SRAM) memory bitcells; or
one or more cross-coupled inverters.

15. The one or more computer-readable storage media of claim 13, wherein the plurality of operating conditions comprises at least one of:
one or more operating voltages;
one or more operating temperatures; or
one or more age-related parameters.

16. The one or more computer-readable storage media of claim 7, further comprising instructions stored thereon that, in response to being executed, cause the computing device to:
generate a set of challenge-response pairs from the set of state information values; and
use, in the authentication process, only a subset of the challenge-response pairs generated from entropy sources that exhibit a stable response at the plurality of different operating conditions for the electronic device.

17. The one or more computer-readable storage media of claim 7, further comprising instructions stored thereon that, in response to being executed, cause the computing device to:
generate a set of challenge-response pairs from the set of state information values; and
use, in the authentication process, challenge-response pairs generated from entropy sources that exhibit a stable response at the plurality of different operating conditions for the electronic device and from entropy sources that exhibit an unstable response at one or more operating conditions for the electronic device.

18. The one or more computer-readable storage media of claim 13, wherein authentication procedure requires that at least a portion of the challenge-response pairs generated include a generated response that does not match an expected response.

* * * * *